US012628253B2

(12) United States Patent
Seo et al.

(10) Patent No.: US 12,628,253 B2
(45) Date of Patent: May 12, 2026

(54) LED DRIVING DEVICE AND LED LIGHTING DEVICE INCLUDING THE SAME

(71) Applicant: LX SEMICON CO., LTD., Daejeon (KR)

(72) Inventors: Byung Jun Seo, Daejeon (KR); Ji Hwan Kim, Daejeon (KR); Young Jin Woo, Daejeon (KR); Jong Min Lee, Daejeon (KR); Ju Pyo Hong, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 116 days.

(21) Appl. No.: 18/499,976

(22) Filed: Nov. 1, 2023

(65) Prior Publication Data

US 2024/0147592 A1 May 2, 2024

(30) Foreign Application Priority Data

Nov. 1, 2022 (KR) ........................ 10-2022-0143757

(51) Int. Cl.
*H05B 45/44* (2020.01)
*H05B 45/14* (2020.01)

(52) U.S. Cl.
CPC ............. *H05B 45/44* (2020.01); *H05B 45/14* (2020.01)

(58) Field of Classification Search
CPC ...... H05B 45/44; H05B 45/14; H05B 45/395; H05B 45/345; H05B 45/347; H05B 45/35;

(Continued)

(56) References Cited

U.S. PATENT DOCUMENTS 7,015,654 B1 * 3/2006 Kuhlmann ............ H02M 3/156 315/291
2008/0198615 A1 * 8/2008 Klipstein ................ F21V 29/74 362/109

(Continued)

FOREIGN PATENT DOCUMENTS

CN 113573944 A * 10/2021 ............. H05B 47/24
CN 115529691 A * 12/2022 ............. H05B 45/52

(Continued)

OTHER PUBLICATIONS

Extended European Search Report issued for the European Patent Application No. 23207235.5 on Mar. 27, 2024, 12 pages.

*Primary Examiner* — Abdullah A Riyami
*Assistant Examiner* — Syed M Kaiser
(74) *Attorney, Agent, or Firm* — ROTHWELL, FIGG, ERNST & MANBECK, P.C.

(57) ABSTRACT

The present disclosure relates to a light emitting diode (LED) driving device that may expand a usable range of LED current and battery voltage by reducing heat generation of an integrated circuit, and an LED lighting device including the same, which may include a current controller that constantly controls an LED current flowing through an LED string and an IC heat dissipation part connected to a node between the LED string and the current controller to dissipate IC heat of the current controller, wherein when a battery voltage supplied to the LED string increases, the IC heat dissipation part reduces a first LED current flowing from the LED string to the current controller and simultaneously increases a second LED current flowing from the LED string to the current controller via the IC heat dissipation part, thereby reducing the IC heat generation of the current controller.

20 Claims, 10 Drawing Sheets

(58) Field of Classification Search
CPC ........ H05B 45/50; H05B 45/30; H05B 45/40; H05B 45/56; H05B 45/37; Y02B 20/30
See application file for complete search history.

(56) References Cited

U.S. PATENT DOCUMENTS

| | | | | |
|---|---|---|---|---|
| 2010/0194465 | A1 * | 8/2010 | Salih ...................... | H05B 45/18 29/25.01 |
| 2012/0081009 | A1 * | 4/2012 | Shteynberg ............ | H05B 45/20 315/122 |
| 2013/0257279 | A1 | 10/2013 | Le | |
| 2014/0128941 | A1 * | 5/2014 | Williams ............... | H05B 45/00 315/193 |
| 2017/0290112 | A1 | 10/2017 | Cortigiani et al. | |
| 2020/0138349 | A1 * | 5/2020 | Lamminmaki ...... | A61B 5/7278 |
| 2020/0236762 | A1 | 7/2020 | Mignoli et al. | |
| 2023/0171864 | A1 * | 6/2023 | Meng ................... | H05B 45/395 315/291 |

FOREIGN PATENT DOCUMENTS

| | | | | | |
|---|---|---|---|---|---|
| KR | 20120067918 | A | * | 6/2012 | ............. H05B 45/44 |
| KR | 20130030189 | A | * | 3/2013 | ............. H05B 45/44 |
| KR | 20130047196 | A | * | 5/2013 | ............. H05B 47/11 |

* cited by examiner

LED DRIVING DEVICE AND LED LIGHTING DEVICE INCLUDING THE SAME

CROSS-REFERENCE TO RELATED APPLICATIONS

This application claims priority to and the benefit of Korean Patent Application No. 10-2022-0143757, filed on Nov. 1, 2022, the disclosure of which is incorporated herein by reference in its entirety.

TECHNICAL FIELD

The present disclosure relates to a light emitting diode (LED) driving device that may expand a usable range of LED current and battery voltage by reducing heat generation of an integrated circuit, and an LED lighting device including the same.

BACKGROUND

In general, a vehicle may employ lighting devices for various uses inside or outside the vehicle.

As an example, the lighting devices of the vehicle may include rear combination lamps installed on both sides of the rear of the vehicle.

The rear combination lamps may include a turn signal lamp, a stop lamp, a tail lamp, a backup lamp, and the like and may be used to inform drivers of other vehicles following an ego vehicle of a driving intention and state of the ego vehicle.

Recently, lighting devices using high-brightness light emitting diodes (LEDs) have been developed, and rear combination lamps using the LEDs have been developed as lighting devices for vehicles.

Rear combination lamps that use LEDs as light sources have changed into various designs, and the number of LEDs used in rear combination lamps has tended to gradually increase according to the design change.

As described above, the LED lighting devices need to operate stably without generating heat, save power, and be developed to be implemented with a small number of components.

However, in the LED lighting devices, when a voltage supplied from a battery increases due to an external or internal environment, a voltage applied to a current controller switch of an LED driving device increases and integrated circuit power (IC Power) of the switch increases, so that heat generation in the integrated circuit increases and restrictions on the LED current and battery voltage occur.

Therefore, it is necessary to develop an LED driving device capable of expand a usable range of LED current and battery voltage by reducing heat generation of an integrated circuit in the future.

SUMMARY

Technical Problem

The present disclosure is directed to solving the above-described problems and other problems.

The present disclosure is directed to providing a light emitting diode (LED) driving device capable of reducing IC heat generation of a current controller and expanding a usable range of LED current and battery voltage by distributing IC power according to an increase in a battery voltage using an IC heat dissipation part disposed between an LED string and the current controller, and an LED lighting device including the same.

Technical Solution

A light emitting diode (LED) driving device according to an embodiment of the present disclosure includes a current controller that constantly controls an LED current flowing through an LED string and an IC heat dissipation part connected to a node between the LED string and the current controller to dissipate IC heat of the current controller, wherein when a battery voltage supplied to the LED string increases, the IC heat dissipation part dissipates a first LED current flowing from the LED string to the current controller and simultaneously increases a second LED current flowing from the LED string to the current controller via the IC heat dissipation part, thereby reducing IC heat generation of the current controller.

An LED driving method according to an embodiment of the present disclosure, which is an LED driving method of an LED driving device in which an IC heat dissipation part is connected between an LED string and a current controller, may include detecting an LED voltage from a node between the LED string and the IC heat dissipation part, checking whether the detected LED voltage increases, controlling an LED current such that the LED current of the LED string is switched from a first path flowing from the LED string to the current controller to a second path flowing from the LED string to the current controller via the IC heat dissipation part when the detected LED voltage increases, and reducing IC heat generation of the current controller when the LED current flows through the second path.

An LED lighting device including an LED driving device according to an embodiment of the present disclosure may include an LED string to which a plurality of LEDs are connected, a battery that supplies voltage to the LED string, a current controller that constantly controls an LED current flowing through the LED string, and an IC heat dissipation part that is connected to a node between the LED string and the current controller to dissipate IC heat of the current controller, wherein when the battery voltage supplied to the LED string increases, the IC heat dissipation part dissipates a first LED current flowing from the LED string to the current controller and simultaneously increases a second LED current flowing from the LED string to the current controller via the IC heat dissipation part, thereby reducing IC heat generation of the current controller.

Advantageous Effects

According to an embodiment of the present disclosure, a light emitting diode (LED) driving device and an LED lighting device including the same may reduce IC heat generation of a current controller and expand a usable range of LED current and battery voltage by distributing IC power according to an increase in a battery voltage using an IC heat dissipation part disposed between an LED string and the current controller.

DETAILED DESCRIPTION OF THE EMBODIMENTS

Figure 1:
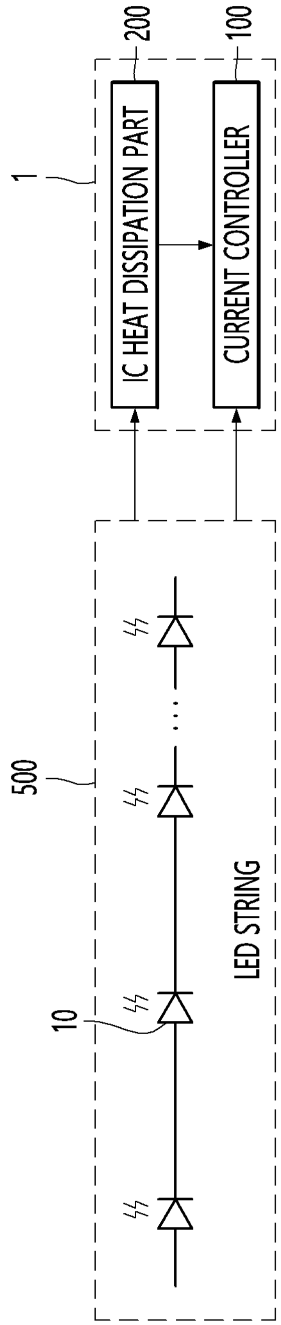
FIG. 1 is a diagram for describing an LED driving device according to an embodiment of the present disclosure.

Hereinafter, the embodiment disclosed in the present specification will be described in detail with reference to the accompanying drawings, but the same or similar components are designated by the same reference numerals regardless of drawing numbers, and repeated description thereof will be omitted. The component suffixes "module" and "part" used in the following description are given or mixed together only considering the ease of creating the specification, and have no meanings or roles that are distinguished from each other by themselves. In addition, in describing the embodiments disclosed in the present specification, when it is determined that detailed descriptions of a related well-known art unnecessarily obscure gist of the embodiments disclosed in the present specification, the detailed description thereof will be omitted. Further, the accompanying drawings are merely for facilitating understanding of the embodiments disclosed in the present specification, the technological scope disclosed in the present specification is not limited by the accompanying drawings, and it should be understood as including all modifications, equivalents and alternatives that fall within the spirit and scope of the present disclosure.

Terms including ordinal numbers, such as first, second, etc., may be used to describe various components, but the components are not limited by the terms. The terms are only used to distinguish one component from another.

It will be understood that when a component is referred to as being "connected" or "coupled" to another component, it may be directly connected or coupled to the other component, but intervening components may be present therebetween. In contrast, it should be understood that when a component is referred to as being "directly connected" or "directly coupled" to another component, there are no other intervening components present.

FIG. 1 is a diagram for describing a light emitting diode (LED) driving device according to an embodiment of the present disclosure.

As shown in FIG. 1, an LED driving device 1 of the present disclosure may include a current controller 100 that constantly controls an LED current flowing through an LED string 500 and an IC heat dissipation part 200 that dissipates IC heat of the current controller 100.

Here, the LED string 500 may be arranged in order by connecting a plurality of LEDs 10 in series and may include one LED string or a plurality of LED strings.

In this case, a plurality of LEDs 10 may be driven by a voltage supplied from a battery to emit light.

In addition, in the LED string 500, an input terminal of the first LED 10 may be connected to the battery and an output terminal of the last LED 10 may be grounded among the plurality of LEDs 10 arranged in order.

As an example, the output terminal of the last LED 10 may be connected to the current controller 100 and grounded through the current controller 100.

In addition, the output terminal of the last LED 10 may be connected to the IC heat dissipation part 200 and grounded through the current controller 100 via the IC heat dissipation part 200.

In addition, the IC heat dissipation part 200 may include one heat dissipation resistor or a plurality of heat dissipation resistors.

Here, when a battery voltage supplied to the LED string 500 increases, the IC heat dissipation part 200 dissipates a first LED current flowing from the LED string 500 to the current controller 100 and simultaneously increases a second LED current flowing from the LED string 500 to the current controller 100 via the IC heat dissipation part 200, thereby reducing IC heat generation of the current controller 100.

Next, the current controller 100 may include a first switching part that has one side connected to a node between the LED string 500 and the IC heat dissipation part 200 and the other side connected to a ground to form a first path through which the first LED current flows and a second switching part that has one side connected to the IC heat dissipation part 200 and the other side connected to the ground to form a second path through which the second LED current flows.

In addition, the current controller 100 may include a voltage regulator that provides a reference voltage and an amplifier that provides an output voltage to each of the first switching part and the second switching part based on a reference voltage provided from the voltage regulator and a feedback voltage provided through a wiring connected to a node between the first and second switching parts and the ground.

Here, the amplifier may provide a first output voltage to the first switching part and provide a second output voltage to the second switching part.

As an example, the first output voltage and the second output voltage may be different from each other.

That is, the second output voltage provided to the second switching part may be greater than the first output voltage provided to the first switching part.

The reason is to increase the resistance of the first switching part and decrease the resistance of the second switching part to decrease the first LED current flowing to the first switching part and increase the second LED current flowing to the second switching part when the battery voltage increases.

Therefore, in the present disclosure, it is possible to reduce IC heat generation of the first switching part due to an increase in an LED voltage by distributing the LED voltage to the first switching part and the second switching part.

In addition, a reduction time of IC heat generation of the current controller 100 may vary depending on a voltage difference between the first output voltage and the second output voltage.

Here, the reduction time of IC heat generation of the current controller 100 may become shorter as the voltage difference between the first output voltage and the second output voltage becomes larger, and may become longer as the voltage difference between the first output voltage and the second output voltage becomes smaller.

That is, when the voltage difference between the first output voltage and the second output voltage increases, a time at which the LED voltage is distributed to the first switching part and the second switching part becomes faster, thereby quickly reducing the IC heat generation.

Next, the amplifier of the current controller 100 may include a first input terminal connected to the voltage regulator to input the reference voltage, a second input terminal connected to the node between the first and second switching parts and the ground to input the feedback voltage, a first output terminal connected to the first switching part to provide the first output voltage, and a second output terminal connected to the second switching part to provide the second output voltage.

In addition, the first switching part of the current controller 100 may include a first transistor connected to the first output terminal of the amplifier, and may control the first LED current flowing from the LED string 500 to the current controller 100 based on the first output voltage when the first output voltage is input from the first output terminal of the amplifier.

Here, the first transistor may include a gate terminal connected to the first output terminal of the amplifier, a drain terminal connected to the LED string, and a source terminal connected to a node between the second input terminal of the amplifier and the ground.

Next, the second switching part of the current controller 100 may include one second transistor or a plurality of second transistors connected to the second output terminal of the amplifier, and may control the second LED current flowing from the LED string 500 to the current controller 100 via the IC heat dissipation part 200 based on the second output voltage when the second output voltage is input from the second output terminal of the amplifier.

Here, the second transistor may include a gate terminal connected to the second output terminal of the amplifier, a drain terminal connected to the IC heat dissipation part, and a source terminal connected to the node between the second input terminal of the amplifier and the ground.

In addition, one side of each of the plurality of second transistors may be connected to the plurality of heat dissipation resistors included in the IC heat dissipation part 200 and may be arranged in one direction.

Here, the total number of the plurality of second transistors may be equal to the total number of the plurality of heat dissipation resistors included in the IC heat dissipation part 200.

Next, a resistor may be disposed between the first and second switching parts of the current controller 100 and the ground.

Here, a resistance value of the resistor may be determined based on a resistance value of the heat dissipation resistor included in the IC heat dissipation part 200.

As an example, the resistance value of the resistor may decrease or increase in proportion to the resistance value of the heat dissipation resistor included in the IC heat dissipation part 200.

Next, the IC heat dissipation part 200 may include the heat dissipation resistor that has one side connected to the first switching part of the current controller 100 and the other side connected to the second switching part of the current controller 100.

Here, the IC heat dissipation part 200 may include one heat dissipation resistor when the first transistor included in the first switching part is one and the second transistor included in the second switching part is one.

In some cases, the IC heat dissipation part 200 may include the plurality of heat dissipation resistors when the first transistor included in the first switching part is one and the second transistor included in the second switching part is plural.

Here, the total number of the plurality of heat dissipation resistors may be equal to the total number of the plurality of second transistors.

That is, the plurality of heat dissipation resistors may be connected to the plurality of second transistors one-to-one, respectively.

As an example, the plurality of heat dissipation resistors may have the same resistance value.

In some cases, in the plurality of heat dissipation resistors, a resistance value of a heat dissipation resistor disposed adjacent to an output terminal of the LED string 500 may be lower than a resistance value of a heat dissipation resistor disposed far from the output terminal of the LED string 500.

That is, the resistance value of the plurality of heat dissipation resistors may sequentially increase as the plurality of heat dissipation resistors are disposed gradually further away from the output terminal of the LED string 500.

In addition, the resistance value of the heat dissipation resistor may be determined according to at least one of LED current consumption of the LED string and a power capacity of the battery that provides the battery voltage.

In addition, the resistance value of the heat dissipation resistor may be determined based on a resistance value of a resistor connected between the first and second switching parts and the ground.

Here, the resistance value of the heat dissipation resistor may decrease or increase in proportion to the resistance value of the resistor connected between the first and second switching parts and the ground.

In addition, a size of the resistance value of the heat dissipation resistor may be directly proportional to a size of a battery voltage value corresponding to a current saturation point including a first time point when the first LED current decreases and then becomes constant or a second time point when the second LED current increases and then becomes constant.

In addition, the LED current may have a current value that is the sum of the first LED current and the second LED current.

That is, the LED current may be determined by Equation of LED current (ILED)=feedback voltage (VFB)/resistance (R1) (where VFB is a feedback voltage provided through a wire connected to the node between the first and second switching parts of the current controller and the ground, and R1 is the resistance of a resistor connected between the first and second switching parts and the ground).

Here, the feedback voltage may be equal to the reference voltage VREF provided from the voltage regulator of the current controller 100.

Next, when the battery voltage increases, the IC heat dissipation part 200 may gradually decrease the first LED current and maintain it constant at the current saturation point and may gradually increase the second LED current and maintain it constant at the current saturation point to reduce IC power of the current controller.

Here, the IC power before the current saturation point may be calculated by Equation of $P1\_IC=(V_{LC}\times ILED)-(V_{LC}^2/RHD)$ (where P1_IC is the IC power before the current saturation point, $V_{LC}$ is the LED voltage flowing from the LED string to the current controller, ILED is the LED current flowing from the LED string to the current controller, and RHD is the resistance of the heat dissipation resistor of the IC heat dissipation part).

In addition, the IC power after the current saturation point may be calculated by Equation of $P2\_IC=(V_{LC}\times ILED)-(ILED^2/RHD)$ (where P2_IC is the IC power after the current saturation point, $V_{LC}$ is the LED voltage flowing from the LED string to the current controller, ILED is the LED current flowing from the LED string to the current controller, and RHD is the resistance of the heat dissipation resistor of the IC heat dissipation part).

In addition, the voltage at the current saturation point may be calculated by Equation of $V_{LC}=ILED\times RHD$ (where $V_{LC}$ is the LED voltage flowing from the LED string to the current controller at the current saturation point, ILED is the LED current flowing from the LED string to the current controller, and RHD is the resistance of the heat dissipation resistor of the IC heat dissipation part).

As another embodiment, the current controller 100 may include a voltage detector that detects an LED voltage flowing through a node between the LED string 500 and the IC heat dissipation part 200, a current selector that selects any one of the first LED current applied from the LED string 500 and the second LED current applied from the IC heat dissipation part 200 based on the detected LED voltage to output it to the current controller 100, and a switching part that has one side connected to the current selector and the other side connected to the ground to control the first LED current or the second LED current.

Here, the voltage detector may be connected to a node between the output terminal of the LED string 500 and the input terminal of the current selector to detect an LED voltage and may control the current selector based on the detected LED voltage.

As an example, when the detected LED voltage is less than the preset reference voltage, the voltage detector may control the current selector such that the first LED current flows from the LED string 500 to the current controller 100, and when the detected LED voltage is more than the preset reference voltage, the voltage detector may control the current selector such that the second LED current flows from the IC heat dissipation part 200 to the current controller 100.

Next, the current selector may include a first switch that electrically connects the LED string 500 and the switching part according to a control signal of the voltage detector and a second switch that electrically connects the IC heat dissipation part 200 and the switching part according to the control signal of the voltage detector.

Here, the second switch may include one switch or a plurality of switches according to the number of heat dissipation resistors of the IC heat dissipation part 200.

As an example, one side of each of a plurality of second switches may be connected to the plurality of heat dissipation resistors included in the IC heat dissipation part 200 and may be arranged in one direction.

In this case, the total number of the plurality of second switches may be equal to the total number of the plurality of heat dissipation resistors included in the IC heat dissipation part 200.

Next, the current controller 100 may include a voltage regulator that provides a reference voltage and an amplifier that provides an output voltage to the switching part based on the reference voltage provided from the voltage regulator and a feedback voltage provided through a wiring connected to a node between the switching parts and the ground.

Here, the amplifier may include a first input terminal connected to the voltage regulator to input the reference voltage, a second input terminal connected to the node between the switching part and the ground to input the feedback voltage, and an output terminal connected to the switching part to provide the output voltage.

As an example, the switching part may include a transistor connected to the output terminal of the amplifier, and when the output voltage is input from the output terminal of the amplifier, the first LED current or the second LED current may be controlled based on the output voltage.

In this case, the transistor may include a gate terminal connected to the output terminal of the amplifier, a drain terminal connected to the current selector, and a source terminal connected to a node between the second input terminal of the amplifier and the ground.

In addition, a resistor may be disposed between the switching part and the ground, and a resistance value of the resistor may be determined based on a resistance value of the heat dissipation resistor included in the IC heat dissipation part 200.

As an example, the resistance value of the resistor may decrease or increase in proportion to the resistance value of the heat dissipation resistor included in the IC heat dissipation part 200.

In addition, the IC heat dissipation part 200 may include a heat dissipation resistor that has one side connected to the first switch of the current selector and the other side connected to the second switch of the current selector.

Here, the IC heat dissipation part 200 may include one heat dissipation resistor when the first and second switches of the current selector are one, respectively.

In some cases, the IC heat dissipation part 200 may include the plurality of heat dissipation resistors when the first switch of the current selector is one and the second switch is plural.

As an example, the total number of heat dissipation resistors may be equal to the total number of the plurality of second switches.

In addition, the plurality of heat dissipation resistors may be connected to the plurality of second switches one-to-one, respectively.

As an example, the plurality of heat dissipation resistors may have the same resistance value.

In some cases, in the plurality of heat dissipation resistors, a resistance value of the heat dissipation resistor disposed adjacent to an output terminal of the LED string 500 may be lower than a resistance value of a heat dissipation resistor disposed far from the output terminal of the LED string 500.

That is, the resistance value of the plurality of heat dissipation resistors may sequentially increase as the plurality of heat dissipation resistors are disposed gradually further away from the output terminal of the LED string 500.

As described above, in the present disclosure, the IC heat generation of the current controller is reduced by distributing IC power according to an increase in a battery voltage using the IC heat dissipation part disposed between the LED string and the current controller, thereby expanding a usable range of LED current and battery voltage.

Figure 2:
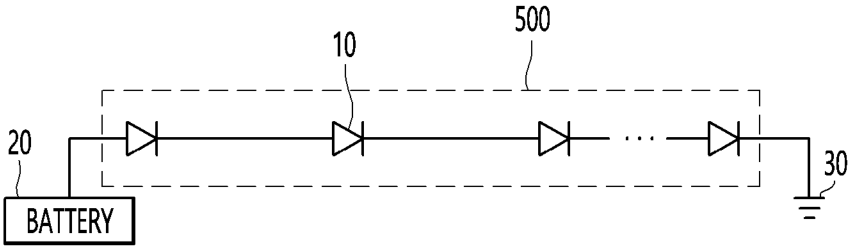
FIG. 2 is a diagram for describing an LED string in FIG. 1.

FIG. 2 is a diagram for describing the LED string in FIG. 1.

As shown in FIG. 2, in the present disclosure, it is possible to detect the voltage flowing through the LED string 500 and distribute IC power according to an increase in a battery voltage using the IC heat dissipation part disposed between the LED string and the current controller when the battery voltage increases.

The LED string 500 may be arranged in order by connecting the plurality of LEDs in series and may include one LED string or a plurality of LED strings.

In this case, the plurality of LEDs 10 may be driven by a voltage supplied from a battery 20 to emit light.

In addition, in the LED string 500, the input terminal of the first LED 10 may be connected to the battery 20 and the output terminal of the last LED 10 may be grounded to a ground 30 among the plurality of LEDs 10 arranged in order.

Here, the output terminal of the last LED 10 may be connected to the current controller and grounded through the current controller or may be connected to the IC heat dissipation part and grounded through the current controller via the IC heat dissipation part.

As an example, the LED string 500 may be sequentially arranged with a first LED, a second LED, and a third LED connected in series.

Here, an input terminal of the first LED may be connected to the battery 20, an output terminal of the first LED may be connected to an input terminal of the second LED, an input terminal of the third LED may be connected to an output terminal of the second LED, and an output terminal of the third LED may be grounded to the ground 30.

Figure 3:
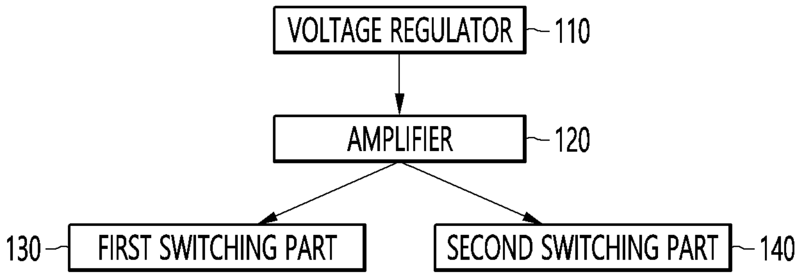
FIG. 3 is a diagram for describing a current controller in FIG. 1.

FIG. 3 is a diagram for describing the current controller in FIG. 1.

As shown in FIG. 3, the current controller of the present disclosure may include a voltage regulator 110, an amplifier 120, and first and second switching parts 130 and 140.

Here, the voltage regulator 110 may provide a reference voltage, and the amplifier 120 may provide an output voltage to each of the first switching part 130 and the second switching part 140 based on a reference voltage provided from the voltage regulator 110 and a feedback voltage provided through a wiring connected to a node between the first and second switching parts 130 and 140 and the ground.

In this case, the amplifier 120 may provide a first output voltage to the first switching part 130 and provide a second output voltage to the second switching part 140.

As an example, the first output voltage and the second output voltage may be different from each other.

The amplifier 120 may include a first input terminal connected to the voltage regulator 110 to input the reference voltage, a second input terminal connected to the node between the first and second switching parts 130 and 140 and the ground to input the feedback voltage, a first output terminal connected to the first switching part 130 to provide the first output voltage, and a second output terminal connected to the second switching part 140 to provide the second output voltage.

In addition, the first switching part 130 may have one side connected to the node between the LED string and the IC heat dissipation part and the other side connected to the ground to form a first path through which the first LED current flows.

The first switching part 130 may include a first transistor connected to the first output terminal of the amplifier 120, and may control the first LED current flowing from the LED string to the current controller based on the first output voltage when the first output voltage is input from the first output terminal of the amplifier 120.

In addition, the second switching part 140 may have one side connected to the IC heat dissipation part and the other side connected to the ground to form a second path through which the second LED current flows.

The second switching part 140 may include one second transistor or a plurality of second transistors connected to the second output terminal of the amplifier 120, and may control the second LED current flowing from the LED string to the current controller via the IC heat dissipation part based on the second output voltage when the second output voltage is input from the second output terminal of the amplifier 120.

Figure 4:
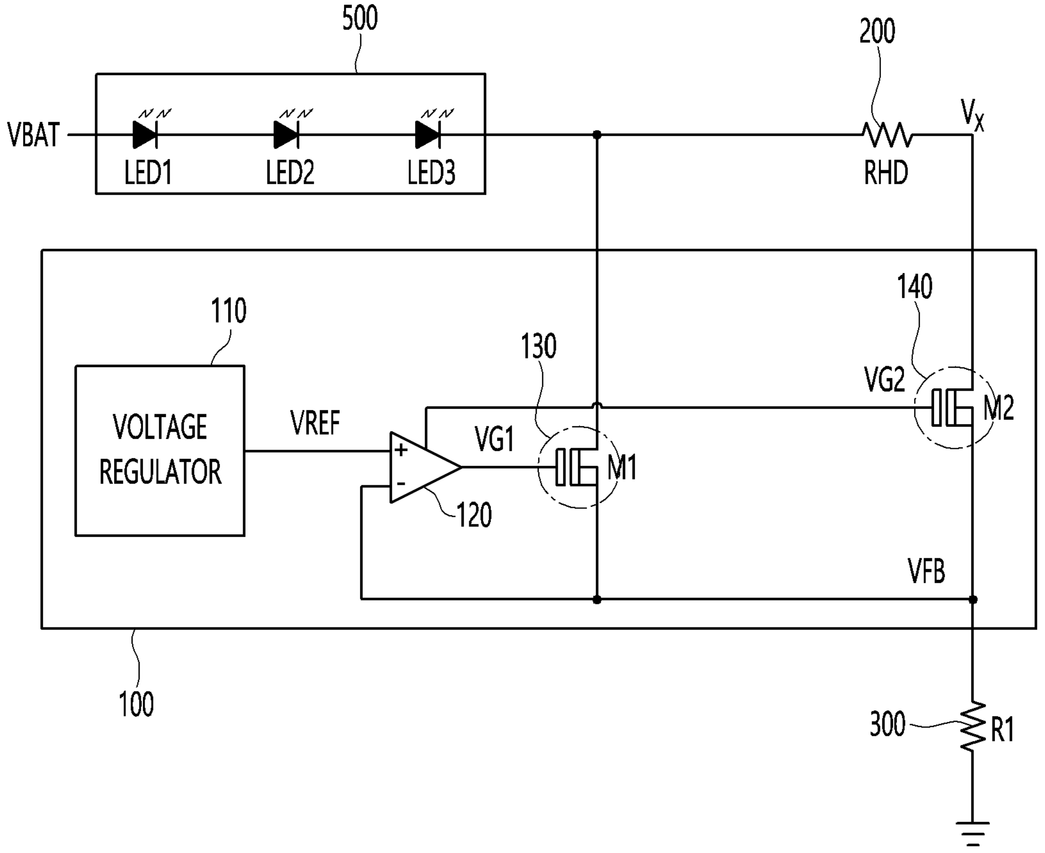
FIG. 4 is a diagram for describing an LED driving device having one heat dissipation resistor.

FIG. 4 is a diagram for describing an LED driving device having one heat dissipation resistor.

As shown in FIG. 4, an LED driving device of the present disclosure may include a current controller 100 that constantly controls an LED current flowing through an LED string 500 and an IC heat dissipation part 200 that dissipates IC heat of the current controller 100.

Here, the IC heat dissipation part 200 may include one heat dissipation resistor RHD.

When a battery voltage VBAT supplied to the LED string 500 increases, the IC heat dissipation part 200 reduces a first LED current flowing from the LED string 500 to the current controller 100 and simultaneously increases a second LED current flowing from the LED string 500 to the current controller 100 via the IC heat dissipation part 200, thereby reducing IC heat generation of the current controller 100.

Next, the current controller 100 may include a first switching part 130 that has one side connected to a node between the LED string 500 and the IC heat dissipation part 200 and the other side connected to a ground to form a first path through which the first LED current flows and a second switching part 140 that has one side connected to the IC heat dissipation part 200 and the other side connected to the ground to form a second path through which the second LED current flows.

In addition, the current controller 100 may include a voltage regulator 110 that provides a reference voltage and an amplifier 120 that provides an output voltage to each of the first switching part 130 and the second switching part 140 based on a reference voltage VREF provided from the voltage regulator 110 and a feedback voltage VFB provided through a wiring connected to a node between the first and second switching parts 130 and 140 and the ground.

Here, the amplifier 120 may provide a first output voltage VG1 to the first switching part 130 and provide a second output voltage VG2 to the second switching part 140.

As an example, the first output voltage VG1 and the second output voltage VG2 may be different from each other.

That is, the second output voltage VG2 provided to the second switching part 140 may be greater than the first output voltage VG1 provided to the first switching part 130.

The reason is to increase the resistance of the first switching part 130 and decrease the resistance of the second switching part 140 to decrease the first LED current flowing to the first switching part 130 and increase the second LED current flowing to the second switching part 140 when the battery voltage VBAT increases, Therefore, in the present disclosure, it is possible to reduce IC heat generation of the first switching part 130 due to an increase in an LED voltage by distributing the LED voltage to the first switching part 130 and the second switching part 140.

In addition, a reduction time of IC heat generation of the current controller 100 may vary depending on a voltage difference between the first output voltage VG1 and the second output voltage VG2.

Here, the reduction time of IC heat generation of the current controller 100 may become shorter as the voltage difference between the first output voltage VG1 and the second output voltage VG2 increases, and may become longer as the voltage difference between the first output voltage VG1 and the second output voltage VG2 becomes smaller.

That is, when the voltage difference between the first output voltage VG1 and the second output voltage VG2 increases, a time at which the LED voltage is distributed to the first switching part 130 and the second switching part 140 becomes faster, thereby quickly reducing the IC heat generation.

Next, the amplifier 120 of the current controller 100 may include a first input terminal connected to the voltage regulator 110 to input the reference voltage VREF, a second input terminal connected to the node between the first and second switching parts 130 and 140 and the ground to input the feedback voltage VFB, a first output terminal connected to the first switching part 130 to provide the first output voltage VG1, and a second output terminal connected to the second switching part 140 to provide the second output voltage VG2.

In addition, the first switching part 130 of the current controller 100 may include a first transistor M1 connected to the first output terminal of the amplifier 120, and may control the first LED current flowing from the LED string 500 to the current controller 100 based on the first output voltage VG1 when the first output voltage VG1 is input from the first output terminal of the amplifier 120.

Here, the first transistor M1 may include a gate terminal connected to the first output terminal of the amplifier 120, a drain terminal connected to the LED string 500, and a source terminal connected to a node between the second input terminal of the amplifier 120 and the ground.

Next, the second switching part 140 of the current controller 100 may include a second transistor M2 connected to the second output terminal of the amplifier 120, and may control the second LED current flowing from the LED string 500 to the current controller 100 via the IC heat dissipation part 200 based on the second output voltage VG2 when the second output voltage VG2 is input from the second output terminal of the amplifier 120.

Here, the second transistor M2 may include a gate terminal connected to the second output terminal of the amplifier 120, a drain terminal connected to the IC heat dissipation part 200, and a source terminal connected to the node between the second input terminal of the amplifier 120 and the ground.

Next, a resistor R1 300 may be disposed between the first and second switching parts 130 and 140 of the current controller 100 and the ground.

Here, a resistance value of the resistor R1 300 may be determined based on a resistance value of the heat dissipation resistor RHD included in the IC heat dissipation part 200.

As an example, the resistance value of the resistor R1 300 may decrease or increase in proportion to the resistance value of the heat dissipation resistor RHD included in the IC heat dissipation part 200.

Next, the IC heat dissipation part 200 may include the heat dissipation resistor RHD that has one side connected to the first switching part 130 of the current controller 100 and the other side connected to the second switching part 140 of the current controller 100.

Here, the IC heat dissipation part 200 may include one heat dissipation resistor RHD when the first transistor M1 included in the first switching part 130 is one and the second transistor M2 included in the second switching part 140 is one.

In addition, the resistance value of the heat dissipation resistor RHD may be determined according to at least one of LED current consumption of the LED string 500 and a power capacity of the battery that provides the battery voltage.

In addition, the resistance value of the heat dissipation resistor RHD may be determined based on a resistance value of the resistor R1 300 connected between the first and second switching parts 130 and 140 and the ground.

Here, the resistance value of the heat dissipation resistor RHD may decrease or increase in proportion to the resistance value of the resistor R1 300 connected between the first and second switching parts 130 and 140 and the ground.

In addition, a size of the resistance value of the heat dissipation resistor RHD may be directly proportional to a size of a battery voltage value corresponding to a current saturation point including a first time point when the first LED current decreases and then becomes constant or a second time point when the second LED current increases and then becomes constant.

Figure 5:
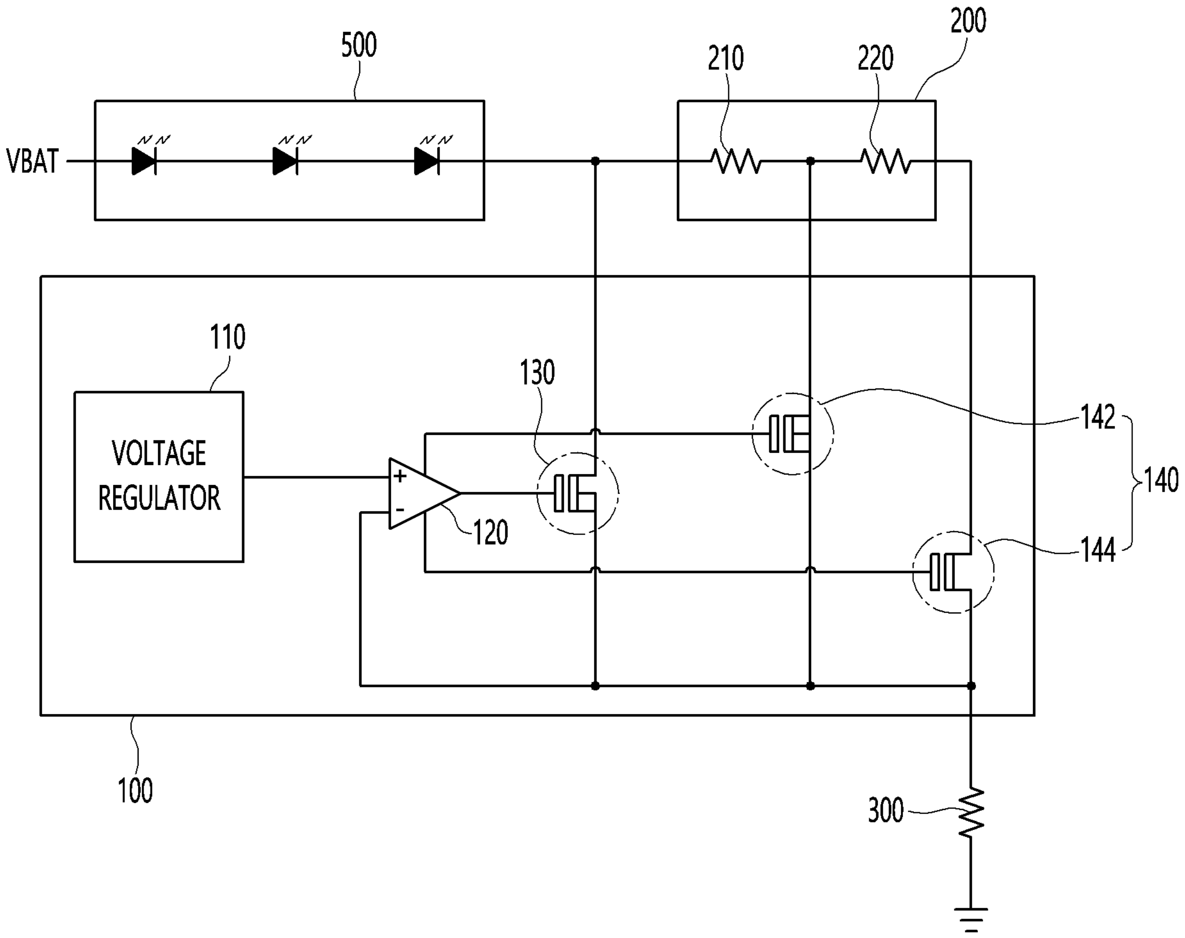
FIG. 5 is a diagram for describing an LED driving device having a plurality of heat dissipation resistors.

FIG. 5 is a diagram for describing an LED driving device having a plurality of heat dissipation resistors.

As shown in FIG. 5, an LED driving device of the present disclosure may include a current controller 100 that constantly controls an LED current flowing through an LED string 500 and an IC heat dissipation part 200 that dissipates IC heat of the current controller 100.

Here, the IC heat dissipation part 200 may include a plurality of heat dissipation resistors.

When a battery voltage VBAT supplied to the LED string 500 increases, the IC heat dissipation part 200 reduces a first LED current flowing from the LED string 500 to the current controller 100 and simultaneously increases a second LED current flowing from the LED string 500 to the current controller 100 via the IC heat dissipation part 200, thereby reducing IC heat generation of the current controller 100.

The IC heat dissipation part 200 may include a plurality of heat dissipation resistors when a first transistor included in a first switching part 130 is one and a second transistor included in a second switching part 140 is plural.

Here, the total number of the plurality of heat dissipation resistors may be equal to the total number of the plurality of second transistors.

That is, the plurality of heat dissipation resistors may be connected to the plurality of second transistors one-to-one, respectively.

As an example, the plurality of heat dissipation resistors may have the same resistance value.

In some cases, in the plurality of heat dissipation resistors, a resistance value of the heat dissipation resistor disposed adjacent to an output terminal of the LED string 500 may be lower than a resistance value of a heat dissipation resistor disposed far from the output terminal of the LED string 500.

That is, the resistance value of the plurality of heat dissipation resistors may sequentially increase as the plurality of heat dissipation resistors are disposed gradually further away from the output terminal of the LED string 500.

As shown in FIG. 5, the IC heat dissipation part 200 may include first and second heat dissipation resistors 210 and 220.

Here, when the number of heat dissipation resistors is two, transistors 142 and 144 of the second switching part 140 may also be two.

That is, the first and second heat dissipation resistors 210 and 220 may be connected to the two transistors 142 and 144 one-to-one, respectively.

As an example, the first and second heat dissipation resistors 210 and 220 may have the same resistance value.

In some cases, in the first and second heat dissipation resistors 210 and 220, a resistance value of a first heat dissipation resistor 210 disposed adjacent to an output terminal of the LED string 500 may be lower than a resistance value of a second heat dissipation resistor 220 disposed far from the output terminal of the LED string 500.

The number or resistance value of heat dissipation resistors may be determined according to at least one of LED current consumption of the LED string 500 and a power capacity of the battery that provides the battery voltage.

In addition, the number or resistance value of heat dissipation resistors may be determined based on a resistance value of the resistor 300 connected between the first and second switching parts 130 and 140 and a ground.

Here, the resistance value of the heat dissipation resistor may decrease or increase in proportion to the resistance value of the resistor 300 connected between the first and second switching parts 130 and 140 and the ground.

In addition, a size of the resistance value of the heat dissipation resistor may be directly proportional to a size of a battery voltage value corresponding to a current saturation point including a first time point when the first LED current decreases and then becomes constant or a second time point when the second LED current increases and then becomes constant.

Figure 6:
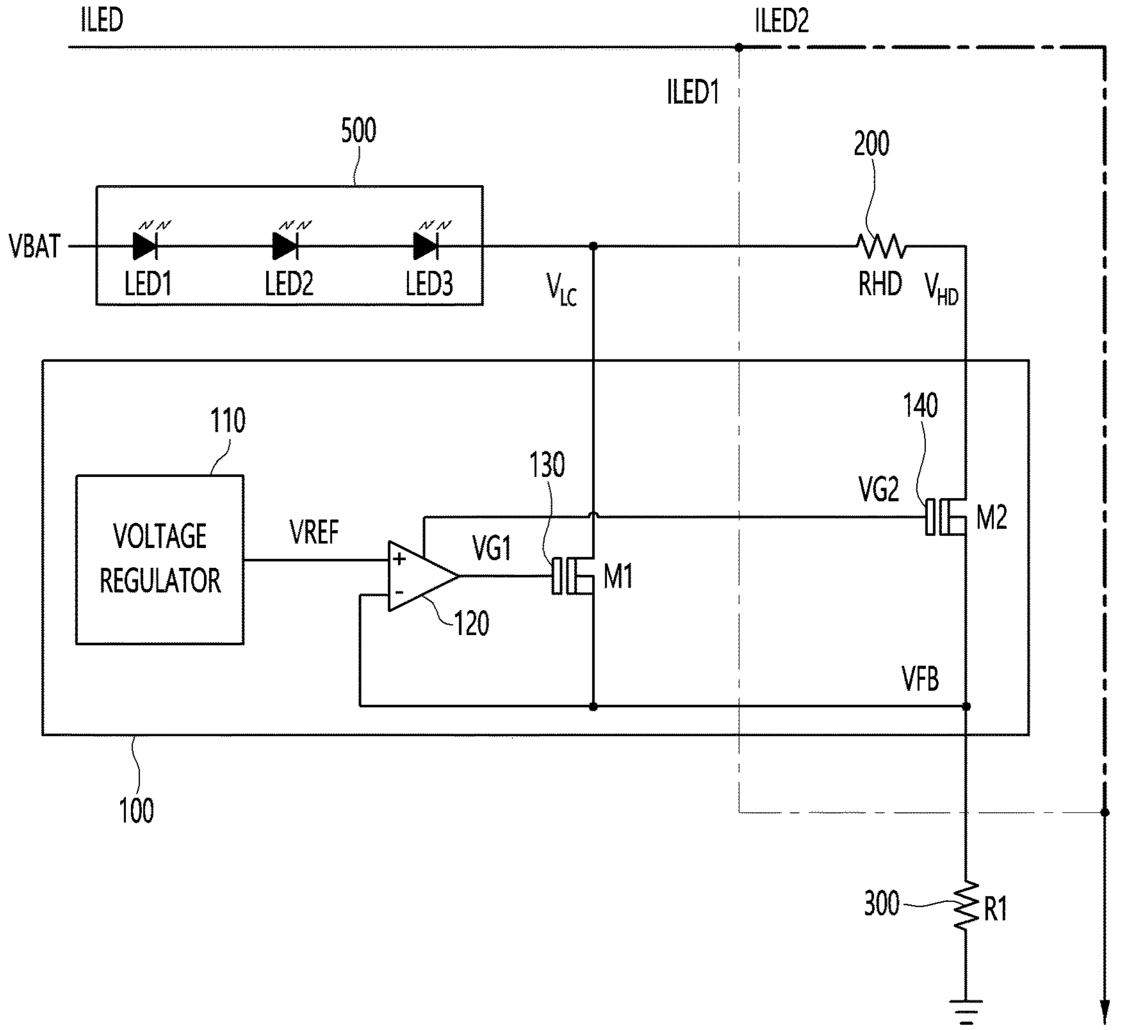
FIG. 6 is a diagram for describing a circuit operation of an LED driving device according to an embodiment of the present disclosure.

FIG. 6 is a diagram for describing a circuit operation of an LED driving device according to an embodiment of the present disclosure.

As shown in FIG. 6, in the present disclosure, it is possible to constantly control an LED current ILED flowing through an LED string 500 through a current controller 100.

Here, the current controller 100 may include a first switching part 130 that has one side connected to a node between the LED string 500 and an IC heat dissipation part 200 and the other side connected to a ground to form a first path through which a first LED current ILED1 flows and a second switching part 140 that has one side connected to the IC heat dissipation part 200 and the other side connected to the ground to form a second path through which a second LED current ILED2 flows.

In addition, in the present disclosure, when a battery voltage VBAT supplied to the LED string 500 increases, it is possible to reduce IC heat generation of the current controller 100 by reducing the first LED current ILED1 flowing from the LED string 500 to the current controller 100 through a heat dissipation resistor RHD of the IC heat dissipation part 200 and simultaneously increasing the second LED current ILED2 flowing from the LED string 500 to the current controller 100 via the IC heat dissipation part 200.

In addition, the current controller 100 of the present disclosure may include a voltage regulator 110 that provides a reference voltage and an amplifier 120 that provides an output voltage to each of a first switching part 130 and a second switching part 140 based on a reference voltage VREF provided from the voltage regulator 110 and a feedback voltage VFB provided through a wiring connected to a node between the first and second switching parts 130 and 140 and the ground.

Here, the amplifier 120 may provide a first output voltage VG1 to the first switching part 130 and provide a second output voltage VG2 to the second switching part 140.

As an example, the first output voltage VG1 and the second output voltage VG2 may be different from each other.

That is, the second output voltage VG2 provided to the second switching part 140 may be greater than the first output voltage VG1 provided to the first switching part 130.

The reason is to increase the resistance of the first switching part 130 and decrease the resistance of the second switching part 140 to decrease the first LED current flowing to the first switching part 130 and increase the second LED current flowing to the second switching part 140 when the battery voltage VBAT increases.

Therefore, in the present disclosure, it is possible to reduce IC heat generation of the first switching part 130 due to an increase in an LED voltage by distributing the LED voltage to the first switching part 130 and the second switching part 140.

In addition, a reduction time of IC heat generation of the current controller 100 may vary depending on a voltage difference between the first output voltage VG1 and the second output voltage VG2.

Here, the reduction time of IC heat generation of the current controller 100 may become shorter as the voltage difference between the first output voltage VG1 and the second output voltage VG2 increases, and may become longer as the voltage difference between the first output voltage VG1 and the second output voltage VG2 becomes smaller.

That is, when the voltage difference between the first output voltage VG1 and the second output voltage VG2 increases, a time at which the LED voltage is distributed to the first switching part 130 and the second switching part 140 becomes faster, thereby quickly reducing the IC heat generation.

In addition, the first switching part 130 of the current controller 100 may include a first transistor M1 connected to the first output terminal of the amplifier 120, and may control the first LED current ILED1 flowing from the LED string 500 to the current controller 100 based on the first output voltage VG1 when the first output voltage VG1 is input from the first output terminal of the amplifier 120.

Next, the second switching part 140 of the current controller 100 may include a second transistor M2 connected to the second output terminal of the amplifier 120, and may control the second LED current ILED2 flowing from the LED string 500 to the current controller 100 via the IC heat dissipation part 200 based on the second output voltage VG2 when the second output voltage VG2 is input from the second output terminal of the amplifier 120.

In addition, in the present disclosure, the LED current ILED may have a current value that is the sum of the first LED current ILED1 and the second LED current ILED2.

That is, the LED current ILED may be determined by Equation of LED current (ILED)=feedback voltage (VFB)/resistance (R1) (where VFB is a feedback voltage provided through a wire connected to the node between the first and second switching parts 130 and 140 of the current controller 100 and the ground, and R1 is the resistance of a resistor 300 connected between the first and second switching parts 130 and 140 and the ground).

Here, the feedback voltage VFB may be equal to the reference voltage VREF provided from the voltage regulator 110 of the current controller 100.

When the battery voltage VBAT increases, the IC heat dissipation part 200 may gradually decrease the first LED current ILED1 and maintain it constant at the current saturation point and may gradually increase the second LED current ILED2 and maintain it constant at the current saturation point to reduce IC power of the current controller.

Here, the IC power before the current saturation point may be calculated by Equation of $P1\_IC=(V_{LC}\times ILED)-(V_{LC}^2/RHD)$ (where P1_IC is the IC power before the current saturation point, $V_{LC}$ is the LED voltage flowing from the LED string to the current controller, ILED is the LED current flowing from the LED string to the current controller, and RHD is the resistance of the heat dissipation resistor of the IC heat dissipation part).

In addition, the IC power after the current saturation point may be calculated by Equation of $P2\_IC=(V_{LC}\times ILED)-(ILED^2/RHD)$ (where P2_IC is the IC power after the current saturation point, $V_{LC}$ is the LED voltage flowing from the LED string to the current controller, ILED is the LED current flowing from the LED string to the current controller, and RHD is the resistance of the heat dissipation resistor of the IC heat dissipation part).

In addition, the voltage at the current saturation point may be calculated by Equation of $V_{LC}=ILED\times RHD$ (where $V_{LC}$ is the LED voltage flowing from the LED string to the current controller at the current saturation point, ILED is the LED current flowing from the LED string to the current controller, and RHD is the resistance of the heat dissipation resistor of the IC heat dissipation part).

Figure 7:
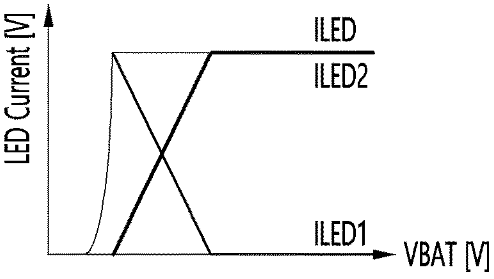
FIG. 7 is a diagram for describing changes in a first LED current and a second LED current according to an increase in a battery voltage.

FIG. 7 is a diagram for describing changes in a first LED current and a second LED current according to an increase in a battery voltage.

As shown in FIG. 7, in the present disclosure, when a battery voltage VBAT increases, a first LED current ILED1 may gradually decrease using a heat dissipation resistor and maintain it constant at a current saturation point and may gradually increase a second LED current ILED2 and maintain it constant at the current saturation point to reduce IC power of the current controlle 100.

Here, the current saturation points of the first LED current ILED1 and the second LED current ILED2 may be the same.

As described above, in the present disclosure, a size of the resistance value of the heat dissipation resistor may be directly proportional to a size of a battery voltage value corresponding to a current saturation point including a first time point when the first LED current decreases and then becomes constant or a second time point when the second LED current increases and then becomes constant.

In the present disclosure, it is possible to reduce IC heat generation by distributing an LED voltage when the battery voltage increases, and to expand a usable range of LED current and battery voltage to a point where the LED current is saturated.

In the case where there is no heat dissipation resistor as in the related art, when a battery voltage increases, since an LED voltage may not be distributed, IC power increases due to an increase in the voltage and IC heat generation occurs, so that restrictions on a usage range of LED current and battery voltage may occur.

Figure 8:
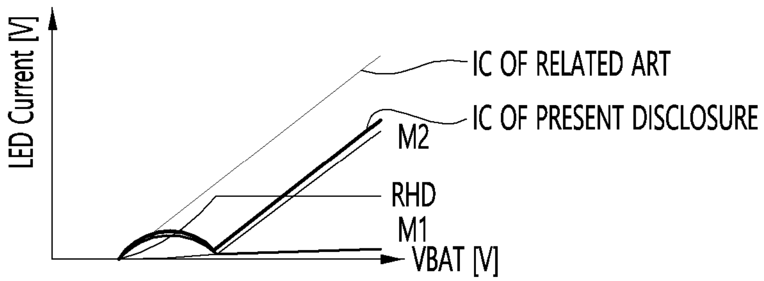
FIG. 8 is a diagram for describing a change in IC power according to an increase in a battery voltage.

FIG. 8 is a diagram for describing a change in IC power according to an increase in a battery voltage.

As shown in FIG. 8, in the present disclosure, when the battery voltage increases, the power of the second transistor M2 of the second switching part may increase after the current saturation point, and the power of the first transistor M1 of the first switching part may decrease due to the voltage distribution of the heat dissipation resistor RHD.

Therefore, IC power in the present disclosure to which the heat dissipation resistor is applied is reduced compared to IC power in the related art to which the heat dissipation resistor is not applied, thereby reducing IC heat generation and expanding a usable range of LED current and battery voltage.

Figure 9:
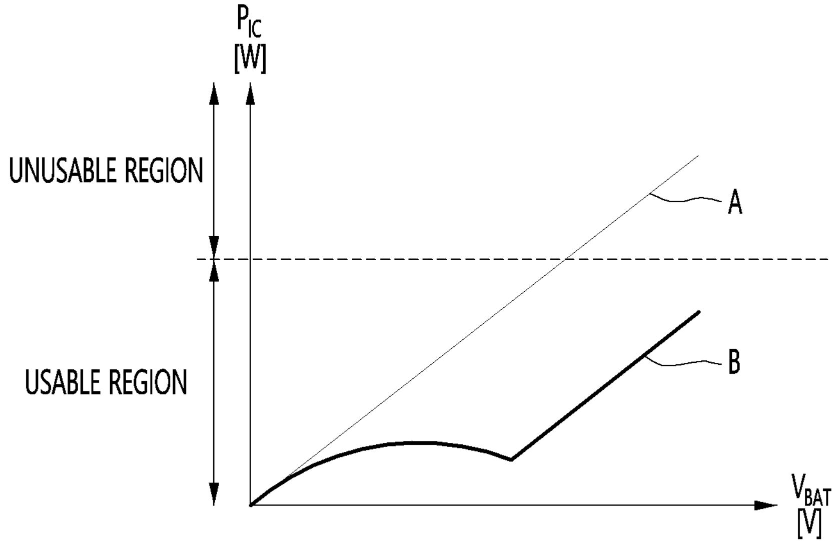
FIG. 9 is a diagram comparing the related art and the present disclosure with respect to IC power changes according to a battery voltage.

FIG. 9 is a diagram comparing the related art and the present disclosure with respect to IC power changes according to a battery voltage.

As shown in FIG. 9, since IC power A of the related art to which a heat dissipation resistor is not applied increases proportionally according to an increase in a battery voltage, IC heat generation occurs, so that restrictions on a usage range of LED current and battery voltage may occur.

On the other hand, as IC Power B of the present disclosure to which a heat dissipation resistor is applied distributes the LED voltage by the heat dissipation resistor when the battery voltage increases, the IC power B may be maintained a constant level until the current saturation point and may gradually increase after the current saturation point.

Therefore, in the present disclosure, it is possible to reduce IC heat generation and expand a usable range of LED current and battery voltage.

Figure 10:
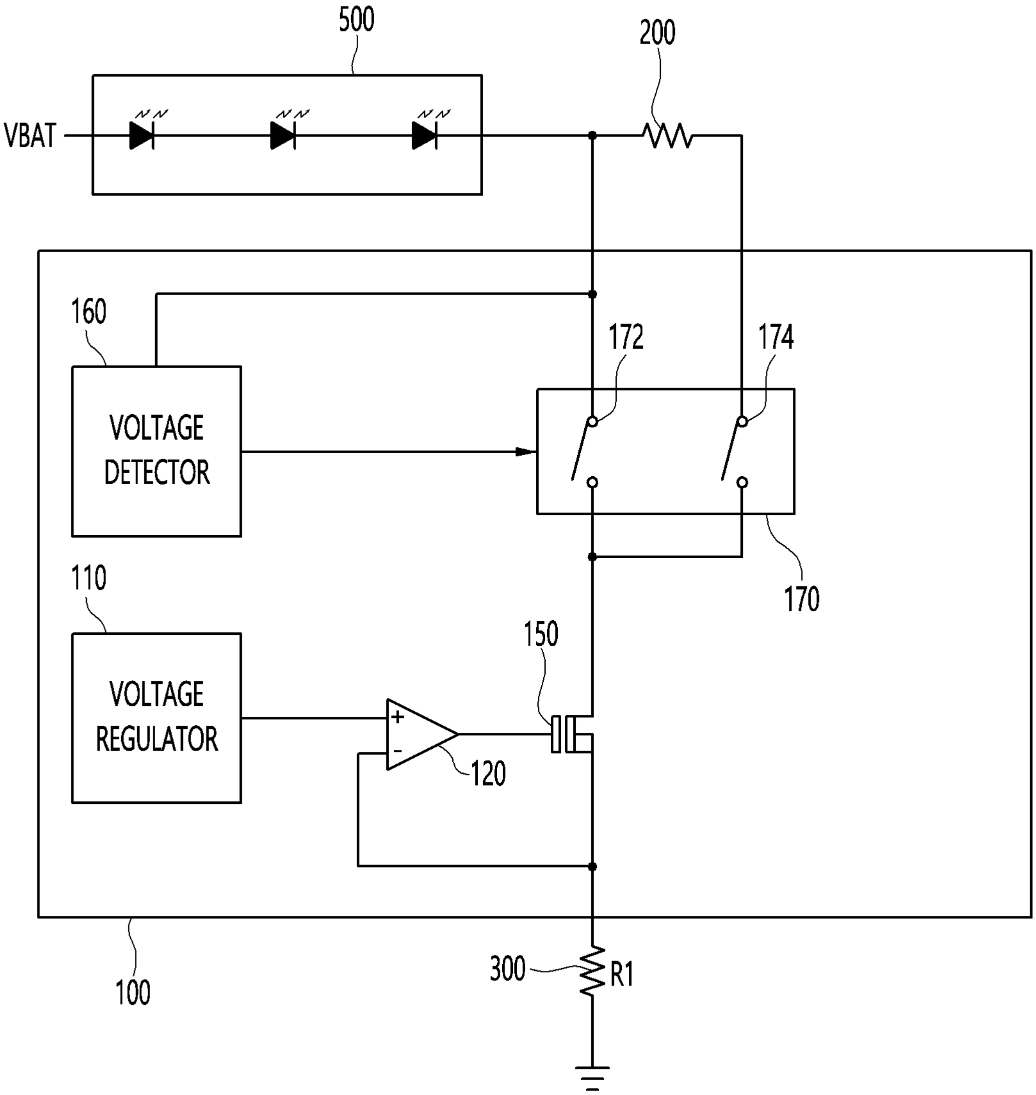
FIGS. 10 and 11 are diagrams for describing an LED driving device according to another embodiment of the present disclosure.
Figure 11:
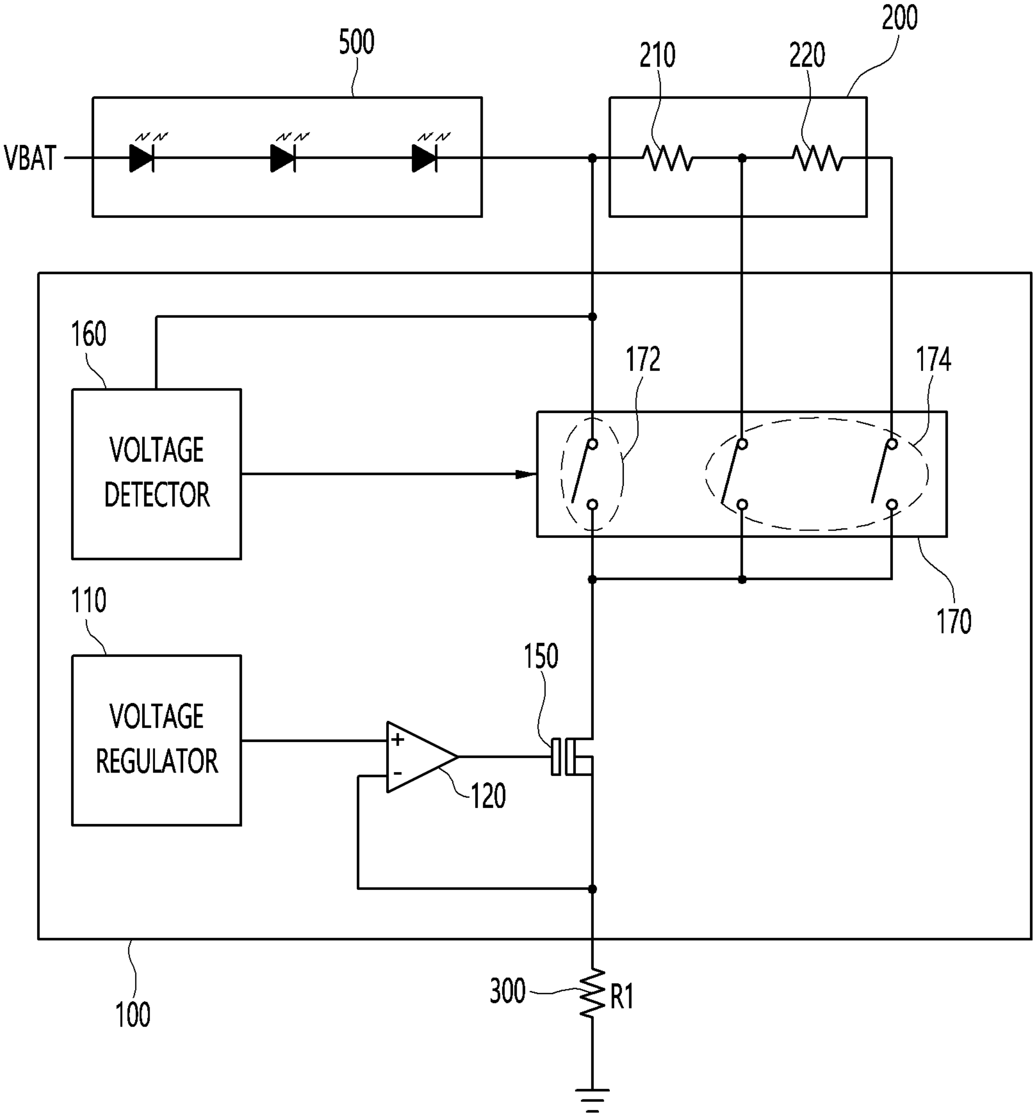

FIGS. 10 and 11 are diagrams for describing an LED driving device according to another embodiment of the present disclosure.

As shown in FIGS. 10 and 11, the present disclosure may include a current controller 100 that constantly controls an LED current flowing through an LED string 500 and an IC heat dissipation part 200 that dissipates IC heat of the current controller 100.

In addition, as shown in FIG. 10, the IC heat dissipation part 200 may include one heat dissipation resistor.

In some cases, as shown in FIG. 11, the IC heat dissipation part 200 may include a plurality of heat dissipation resistors.

The current controller 100 may include a voltage detector 160 that detects an LED voltage flowing through a node between the LED string 500 and the IC heat dissipation part 200, a current selector 170 that selects any one of a first LED current applied from the LED string 500 and a second LED current applied from the IC heat dissipation part 200 based on the detected LED voltage to output it to the current controller 100, and a switching part 150 that has one side connected to the current selector 170 and the other side connected to a ground to control the first LED current or the second LED current.

Here, the voltage detector 160 may be connected to a node between an output terminal of the LED string 500 and an input terminal of the current selector 170 to detect the LED voltage and may control the current selector 170 based on the detected LED voltage.

As an example, when the detected LED voltage is less than the preset reference voltage, the voltage detector may control the current selector 170 such that the first LED current flows from the LED string 500 to the current controller 100, and when the detected LED voltage is more than the preset reference voltage, the voltage detector may control the current selector 170 such that the second LED current flows from the IC heat dissipation part 200 to the current controller 100.

Next, the current selector 170 may include a first switch 172 that electrically connects the LED string 500 and the switching part 150 according to a control signal of the voltage detector 160 and a second switch 174 that electrically connects the IC heat dissipation part 200 and the switching part 150 according to the control signal of the voltage detector 160.

Here, as shown in FIG. 10, the second switch 174 may be constituted of one according to the number of heat dissipation resistors of the IC heat dissipation part 200.

In some cases, as shown in FIG. 11, the second switch 174 may be constituted of a plurality of switches according to the number of heat dissipation resistors of the IC heat dissipation part 200.

As an example, one side of each of a plurality of second switches 174 may be connected to a plurality of heat dissipation resistors 210 and 220 included in the IC heat dissipation part 200 and may be arranged in one direction.

In this case, the total number of the plurality of second switches 174 may be equal to the total number of the plurality of heat dissipation resistors 210 and 220 included in the IC heat dissipation part 200.

Next, the current controller 100 may include a voltage regulator 110 that provides a reference voltage and an amplifier 120 that provides an output voltage to the switching part 150 based on the reference voltage provided from the voltage regulator 110 and a feedback voltage provided through a wiring connected to a node between the switching part 150 and the ground.

Here, the amplifier 120 may include a first input terminal connected to the voltage regulator 110 to input the reference voltage, a second input terminal connected to the node between the switching part 150 and the ground to input the feedback voltage, and an output terminal connected to the switching part 150 to provide the output voltage.

As an example, the switching part 150 may include a transistor connected to the output terminal of the amplifier 120, and when the output voltage is input from the output terminal of the amplifier 120, the first LED current or the second LED current may be controlled based on the output voltage.

In this case, the transistor may include a gate terminal connected to the output terminal of the amplifier 120, a drain terminal connected to the current selector 170, and a source terminal connected to a node between the second input terminal of the amplifier 120 and the ground.

In addition, a resistor 300 may be disposed between the switching part 150 and the ground, and a resistance value of the resistor 300 may be determined based on a resistance value of the heat dissipation resistor included in the IC heat dissipation part 200.

As an example, the resistance value of the resistor 300 may decrease or increase in proportion to the resistance value of the heat dissipation resistor included in the IC heat dissipation part 200.

In addition, the IC heat dissipation part 200 may include a heat dissipation resistor that has one side connected to the first switch 172 of the current selector 170 and the other side connected to the second switch 174 of the current selector 170.

Here, as shown in FIG. 10, the IC heat dissipation part 200 may include one heat dissipation resistor when the first switch 172 and the second switch 174 of the current selector 170 are one, respectively.

In some cases, as shown in FIG. 11, the IC heat dissipation part 200 may include the plurality of heat dissipation resistors when the first switch 172 of the current selector 170 is one and the second switch 174 is plural.

As an example, the total number of heat dissipation resistors may be equal to the total number of the plurality of second switches 174.

In addition, the plurality of heat dissipation resistors may be connected to the plurality of second switches 174 one-to-one, respectively.

As an example, a plurality of heat dissipation resistors may have the same resistance value.

In some cases, in the plurality of heat dissipation resistors, a resistance value of the heat dissipation resistor disposed adjacent to an output terminal of the LED string 500 may be lower than a resistance value of a heat dissipation resistor disposed far from the output terminal of the LED string 500.

That is, the resistance value of the plurality of heat dissipation resistors may sequentially increase as the plurality of heat dissipation resistors are disposed gradually further away from the output terminal of the LED string 500.

As described above, in the present disclosure, the IC heat generation of the current controller 100 is reduced by distributing IC power according to an increase in a battery voltage using the IC heat dissipation part 200 disposed between the LED string 500 and the current controller 100, thereby expanding a usable range of LED current and battery voltage.

Figure 12:
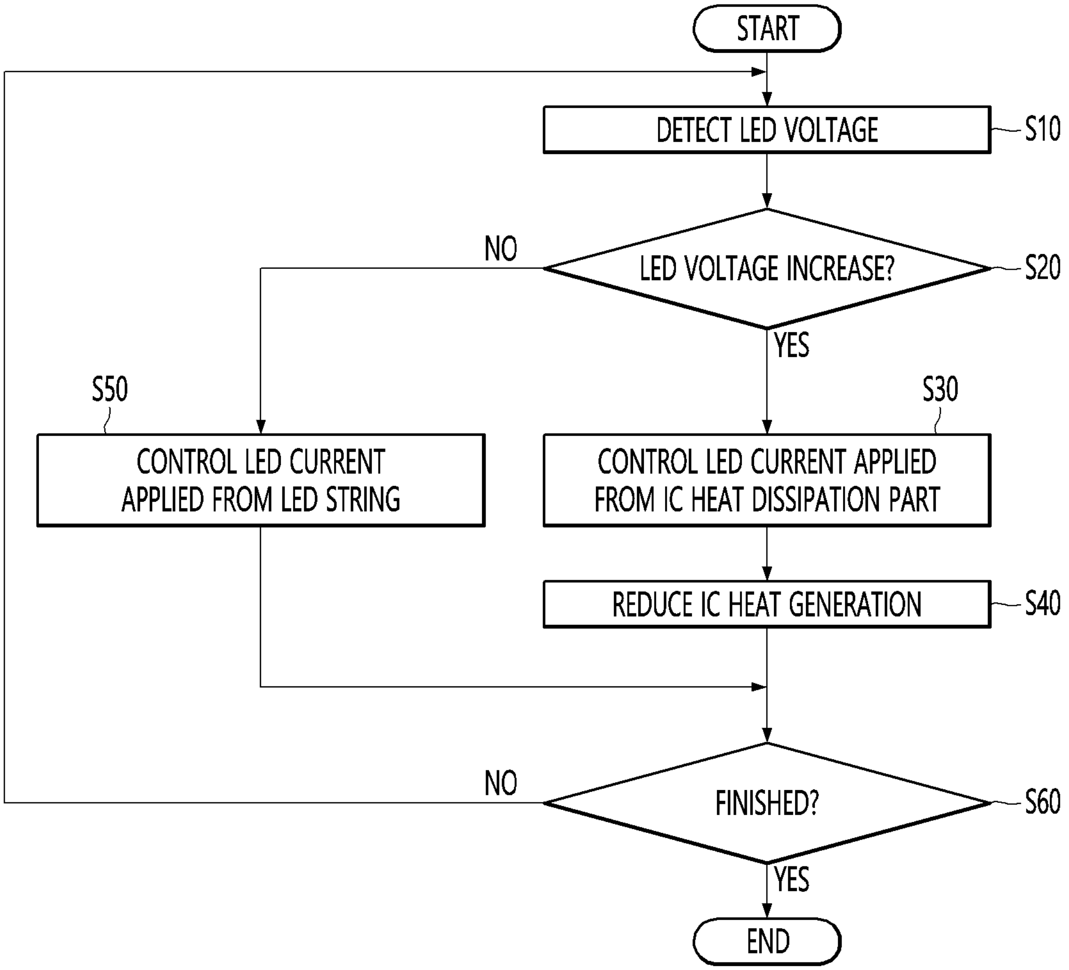
FIG. 12 is a flowchart for describing an LED driving method of the present disclosure.

FIG. 12 is a flowchart for describing an LED driving method of the present disclosure.

As shown in FIG. 12, in the present disclosure, it is possible to detect the LED voltage from a node between the LED string and the IC heat dissipation part (S10).

Next, in the present disclosure, it is possible to check whether the detected LED voltage increases (S20).

Here, in the present disclosure, it is possible to recognize that when the battery voltage supplied to the LED string increases, the LED voltage increases.

Next, in the present disclosure, it is possible to control the LED current such that the LED current of the LED string is switched from the first path flowing from the LED string to the current controller to the second path flowing from the LED string to the current controller via the IC heat dissipation part when the LED voltage increases (S30).

Here, in the present disclosure, it is possible to control the LED current such that the first LED current and the second LED current are maintained constant by reducing the first LED current flowing through the first path and simultaneously increasing the second LED current flowing through the second path when the LED voltage increases.

In some cases, in the present disclosure, it is possible to select the LED current and control the selected LED current such that the first LED current flowing through the first path is block and the second LED current flowing through the second path is input when the LED voltage increases.

In addition, in the present disclosure, it is possible to reduce IC heat generation of the current controller when the LED current flows through the second path (S40).

In addition, in the present disclosure, it is possible to control the LED current flowing from the LED string to the current controller when the LED voltage does not increase (S50).

Next, in the present disclosure, it is possible to check whether LED driving has finished (S60) and terminate all operations when driving has finished.

As described above, in the present disclosure, it is possible to reduce IC heat generation of the current controller and expand a usable range of LED current and battery voltage by distributing IC power according to an increase of the battery voltage using the IC heat dissipation part disposed between the LED string and the current controller.

Figure 13:
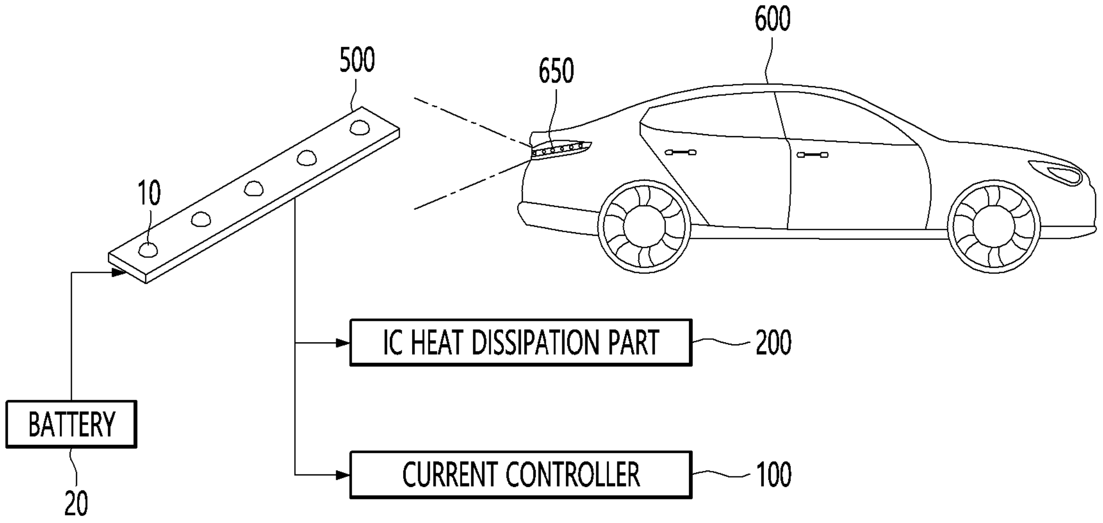
FIG. 13 is a diagram for describing an LED lighting device of the present disclosure.

FIG. 13 is a diagram for describing an LED lighting device of the present disclosure.

As shown in FIG. 13, the present disclosure may be applied to an LED lighting device 650 of a vehicle 600.

Here, the LED lighting device 650 may be applied to rear combination lamps of the vehicle 600, but it is merely an example and is not limited thereto.

The LED lighting device 650 may include an LED string 500 to which a plurality of LEDs 10 are connected, a battery 20 that supplies voltage to the LED string 500, a current controller 100 that constantly controls an LED current flowing through the LED string 500, and an IC heat dissipation part 200 that is connected to a node between the LED string 500 and the current controller 100 to dissipate IC heat of the current controller 100.

Here, when a battery voltage supplied to the LED string 500 increases, the IC heat dissipation part 200 reduces a first LED current flowing from the LED string 500 to the current controller 100 and simultaneously increases a second LED current flowing from the LED string 500 to the current controller 100 via the IC heat dissipation part 200, thereby reducing IC heat generation of the current controller 100.

The present disclosure described above may be implemented as computer-readable code on a program-recorded medium. A computer-readable media includes all types of recording devices in which data may be read by a computer system is stored. As an example of the computer-readable media, there are a hard disk drive (HDD), a solid state disk (SSD), a silicon disk drive (SDD), ROM, RAM, CD-ROM, magnetic tape, floppy disk, optical data storage device, and the like. In addition, the computer may include a processor of an artificial intelligence device.

What is claimed is:

1. A light emitting diode (LED) driving device comprising:

a current controller configured to constantly control an LED current flowing through an LED string; and an IC heat dissipation part connected to a node between the LED string and the current controller to dissipate IC heat of the current controller, wherein when a battery voltage supplied to the LED string increases, a first LED current flowing from the LED string to the current controller is decreased and simultaneously a second LED current flowing from the LED string to the current controller via the IC heat dissipation part is increased to dissipate IC heat generation of the current controller, wherein the current controller includes:

a first switching part that has one side connected to a node between the LED string and the IC heat dissipation part to form a first path through which the first LED current flows; and a second switching part that has one side connected to the IC heat dissipation part to form a second path through which the second LED current flows, and wherein a first output voltage provided to the first switching part and a second output voltage provided to the second switching part are different from each other so as to adjust a resistance difference between the first switching part and the second switching part.

2. The LED driving device of claim 1, wherein the first switching part has the other side connected to a ground to form the first path; and the second switching part has the other side connected to the ground to form the second path.

3. The LED driving device of claim 2, wherein the current controller includes:

a voltage regulator configured to provide a reference voltage; and an amplifier configured to provide an output voltage to each of the first switching part and the second switching part based on the reference voltage provided from the voltage regulator and a feedback voltage provided through a wire connected to a node between the first and second switching parts and the ground.

4. The LED driving device of claim 3, wherein the first switching part includes a first transistor connected to a first output terminal of the amplifier, and when the first output voltage is input from the first output terminal of the amplifier, the first switching part is configured to control the first LED current flowing from the LED string to the current controller based on the first output voltage.

5. The LED driving device of claim 3, wherein the second switching part includes one second transistor or a plurality of second transistors connected to a second output terminal of the amplifier, and when the second output voltage is input from the second output terminal of the amplifier, the second switching part is configured to control the second LED current flowing from the LED string to the current controller via the IC heat dissipation part based on the second output voltage.

6. The LED driving device of claim 1, wherein the IC heat dissipation part includes a heat dissipation resistor that has one side connected to the first switching part of the current controller and the other side connected to the second switching part of the current controller.

7. The LED driving device of claim 6, wherein the IC heat dissipation part includes one heat dissipation resistor when a first transistor included in the first switching part is one and the second transistor included in the second switching part is one.

8. The LED driving device of claim 6, wherein the IC heat dissipation part includes a plurality of heat dissipation resistors when the first transistor included in the first switching part is one and a second transistor included in the second switching part is plural.

9. The LED driving device of claim 6, wherein a resistance value of the heat dissipation resistor is determined according to at least one of LED current consumption of the LED string and a power capacity of a battery that provides the battery voltage.

10. The LED driving device of claim 6, wherein a resistance value of the heat dissipation resistor is determined based on a resistance value of a resistor connected between the first and second switching parts and the ground.

11. The LED driving device of claim 6, wherein a size of a resistance value of the heat dissipation resistor is directly proportional to a size of a battery voltage value corresponding to a current saturation point including a first time point when the first LED current is decreased and then becomes constant or a second time point when the second LED current is increased and then becomes constant.

12. The LED driving device of claim 11, wherein when the battery voltage increases, the IC heat dissipation part gradually decreases the first LED current and maintains it constant at the current saturation point and gradually increases the second LED current and maintains it constant at the current saturation point to dissipate IC power of the current controller.

13. The LED driving device of claim 12, wherein IC power before the current saturation point is calculated by Equation of $P1\_IC=(V_{LC}\times ILED)-(V_{LC}^2/RHD)$ (where P1_IC is the IC power before the current saturation point, $V_{LC}$ is the LED voltage flowing from the LED string to the current controller, ILED is the LED current flowing from the LED string to the current controller, and RHD is the resistance of the heat dissipation resistor of the IC heat dissipation part).

14. The LED driving device of claim 12, wherein IC power after the current saturation point is calculated by Equation of $P2\_IC=(V_{LC}\times ILED)-(ILED^2/RHD)$ (where P2_IC is the IC power after the current saturation point, $V_{LC}$ is the LED voltage flowing from the LED string to the current controller, ILED is the LED current flowing from the LED string to the current controller, and RHD is the resistance of the heat dissipation resistor of the IC heat dissipation part).

15. The LED driving device of claim 12, wherein a voltage at the current saturation point is calculated by Equation of $V_{LC}=ILED\times RHD$ (where $V_{LC}$ is the LED voltage flowing from the LED string to the current controller at the current saturation point, ILED is the LED current flowing from the LED string to the current controller, and RHD is the resistance of the heat dissipation resistor of the IC heat dissipation part).

16. The LED driving device of claim 1, wherein the current controller includes: a voltage detector configured to detect an LED voltage flowing through the node between the LED string and the IC heat dissipation part;

a current selector configured to select any one of the first LED current applied from the LED string and the second LED current applied from the IC heat dissipation part based on the detected LED voltage to output the selected LED current to the current controller; and a switching part that has one side connected to the current selector and the other side connected to a ground to control the first LED current or the second LED current.

17. The LED driving device of claim 16, wherein the current selector includes: a first switch configured to electrically connect the LED string and the switching part according to a control signal of the voltage detector; and a second switch configured to electrically connect the IC heat dissipation part and the switching part according to the control signal of the voltage detector.

18. The LED driving device of claim 17, wherein the second switch includes one switch or a plurality of switches according to the number of heat dissipation resistors of the IC heat dissipation part.

19. An LED driving method of an LED driving device in which an IC heat dissipation part is connected between an LED string and a current controller comprising:

detecting an LED voltage from a node between the LED string and the IC heat dissipation part;

checking whether the detected LED voltage increases;

controlling an LED current such that the LED current of the LED string is switched from a first path flowing from the LED string to the current controller to a second path flowing from the LED string to the current controller via the IC heat dissipation part when the LED voltage increases; and reducing IC heat generation of the current controller when the LED current flows through the second path, wherein the current controller includes:

a first switching part that has one side connected to a node between the LED string and the IC heat dissipation part to form the first path through which the first LED current flows; and a second switching part that has one side connected to the IC heat dissipation part to form the second path through which the second LED current flows, and wherein a first output voltage provided to the first switching part and a second output voltage provided to the second switching part are different from each other so as to adjust a resistance difference between the first switching part and the second switching part.

20. An LED lighting device comprising:

an LED string to which a plurality of LEDs are connected;

a battery configured to supply a voltage to the LED string;

a current controller configured to constantly control an LED current flowing through the LED string; and an IC heat dissipation part connected to a node between the LED string and the current controller to dissipate IC heat of the current controller, wherein when the battery voltage supplied to the LED string increases, a first LED current flowing from the LED string to the current controller is decreased and simultaneously a second LED current flowing from the LED string to the current controller via the IC heat dissipation part is increased to reduce IC heat generation of the current controller, wherein the current controller includes:

a first switching part that has one side connected to a node between the LED string and the IC heat dissipation part to form a first path through which the first LED current flows; and a second switching part that has one side connected to the IC heat dissipation part to form a second path through which the second LED current flows, and wherein a first output voltage provided to the first switching part and a second output voltage provided to the second switching part are different from each other so as to adjust a resistance difference between the first switching part and the second switching part.

* * * * *